(12) United States Patent
Moore

(10) Patent No.: US 6,397,986 B2
(45) Date of Patent: *Jun. 4, 2002

(54) COLLET STYLE TREAD BRAKE UNIT

(75) Inventor: Roland S. Moore, Taylors, SC (US)

(73) Assignee: Westinghouse Air Brake Technologies Corporation, Wilmerding, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,885

(22) Filed: Sep. 23, 1999

(51) Int. Cl.[7] ............................................. F16D 65/56
(52) U.S. Cl. ................................. 188/203; 188/153 D
(58) Field of Search ........................ 188/195, 196 R, 188/170, 153 R, 72.3, 72.4, 72.6, 72.7, 71.8, 197, 196 C, 196 V, 203

(56) References Cited

U.S. PATENT DOCUMENTS

| | | | | |
|---|---|---|---|---|
| 3,576,152 A | * | 4/1971 | Chevreux | 92/65 |
| 3,701,398 A | * | 10/1972 | Martins | 188/71.8 |
| 3,995,537 A | | 12/1976 | Severinsson | |
| 4,014,414 A | * | 3/1977 | Yamamoto | 188/170 |
| 4,050,554 A | * | 9/1977 | Scheffel | 188/203 |
| 4,088,205 A | * | 5/1978 | Frania et al. | 188/196 D |
| 4,649,804 A | * | 3/1987 | Oberlander | 92/63 |
| 5,423,401 A | * | 6/1995 | Noah | 188/203 |
| 5,937,974 A | * | 8/1999 | Cathcart | 188/203 |

* cited by examiner

Primary Examiner—Christopher P. Schwartz
(74) Attorney, Agent, or Firm—James Ray & Associates

(57) ABSTRACT

A brake actuator for use in railway transit and similar vehicles to adjust for wear of braking components located on such vehicles. The brake actuator includes an externally threaded or serrated rod having a longitudinal axis. Such brake actuator further includes power and slack adjusting collets disposed on the rod and located in respective housings disposed about the collets and rod. A yoke member is disposed about and in engagement with the power collet housing and a first axially translatable bearing is disposed on the yoke member. A second fixed bearing is spaced from the axially translatable bearing and a piston is disposed for movement in a direction generally perpendicular to the longitudinal axis of the rod. The piston has an integral fork-shaped wedge disposed astraddle the threaded or serrated rod for movement to a location between the bearings. The fork-shaped wedge is effective to axially translate the first bearing, yoke member, power collet and rod in a direction perpendicular to the direction of movement of the piston and wedge when the wedge enters between and engages the bearings.

5 Claims, 3 Drawing Sheets

COLLET STYLE TREAD BRAKE UNIT

FIELD OF THE INVENTION

The present invention relates, in general, to a pressure responsive type brake actuator for use on railway, or other similar type, vehicles and, more particularly, this invention relates to a tread brake actuator having a power and a slack adjuster collet that enables automatic slack adjustment using fewer operating components.

BACKGROUND OF THE INVENTION

Currently used tread brake actuators employ a plurality of brake adjusting components in the form of nuts, ratchets, clutches and springs to compensate for wear of both the wheel tread and friction material of a brake shoe. FIG. 3 of the drawings in the present application is a cross sectional view of such type brake actuator.

Another and older type tread brake actuator is shown in U.S. Pat. No. 3,995,537 to Severinsson. In both of these devices, a fluid responsive piston moves in a direction perpendicular to a push rod that operates to apply brake shoes directly to tread surfaces of railway vehicle wheels. Slack adjustments in the brake unit of the Severinsson patent are manually made by a nut disposed on components located outside of a housing containing the piston and push rod of the brake unit. The disclosure of this patent is incorporated herein by reference thereto.

U.S. Pat. No. 5,423,401 to Noah et al., which is assigned to the assignee of the present application, discloses power and slack adjuster collets located on a push rod of a disc type brake actuator. The disclosure of this patent is also incorporated herein by reference thereto.

SUMMARY OF THE INVENTION

The present invention uses collet structures, similar to those disclosed in the Noah et al. patent, in a tread brake unit and thereby eliminates the multiple components of currently available tread brake units for adjusting for wear of brake material and wheel surfaces. More particularly, the invention employs two housing structures respectively located about the slack adjuster and power collets. The power collet housing provides a bearing surface that forces the power collet into engagement with an externally threaded push rod when air pressure is received by a brake applying piston. The slack adjuster collet and its housing, which is fixed, have a clearance between them that corresponds to a typical clearance provided between the brake shoe and wheel surface. The push rod is translated by the power collet to apply the brake shoe to the wheel surface and causes the slack adjuster collet to move until the brake shoe engages the wheel surface under a braking force or until the slack adjuster collet contacts its housing. Such contact occurs when the distance the push rod must travel to apply such braking force exceeds the original clearance of the brake shoe and wheel. This contact causes the slack adjuster collet to stop while the push rod continues to travel through the slack adjuster collet and its associated housing. When air pressure is released, the piston moves away from the brake applying position under force of a spring and the housing of the power collet returns to its original position due to the action of another spring. The return action of the housing of the power collet pulls the power collet in a rearward direction which pulls the push rod and slack adjuster collet rearwardly until the slack adjuster collet contacts its housing at the end opposite the brake applying end of the housing. When contact is made the slack adjuster collet stops and holds the push rod, thus preventing further rearward movement of the push rod. The actuator is now adjusted to the increased brake shoe/wheel surface clearance due to wear. If the power collet is not in a fully retracted position it will continue to move after the slack adjuster collet contacts its housing, as the power collet is now free to slide on the push rod until the power collet housing is in a fully retracted position.

OBJECTS OF THE INVENTION

It is, therefore, a primary object of the present invention to use a slack adjusting collet similar to that of the above noted Noah et al. patent in tread brake units in place of currently used slack adjusting nuts, ratchets and clutches in order to significantly reduce the number of slack adjusting components required in a tread brake unit.

Another object of the present invention is to provide a railway and/or other similar type vehicle fluid pressure operated tread brake actuator having an improved collet style slack adjusting mechanism which is significantly more maintenance free than previously used slack adjusting components.

Still another object of the present invention is to provide a railway and/or other similar type vehicle fluid pressure operated tread brake actuator having an improved collet style slack adjusting mechanism which is generally less expensive to manufacture due to significantly reduced assembly time required compared to the time required to assemble previously used tread brake actuators.

Yet another object of the present invention is to provide a railway and/or other similar type vehicle fluid pressure operated tread brake actuator having a collet style slack adjusting mechanism that does not require special equipment to install.

A further object of the present invention is to provide a railway and/or other similar type vehicle fluid pressure operated tread brake actuator having a collet style slack adjusting mechanism that is lighter in weight than previously used slack adjusters.

It is an additional object of the present invention to provide a railway and/or other similar type vehicle fluid pressure operated tread brake actuator having a collet style slack adjusting mechanism that exhibits a long operating life.

In addition to the objects and advantages of the present invention described above, various other objects and advantages of the invention will become more readily apparent to those persons skilled in the relevant art from the following more detailed description of the invention, particularly, when such description is taken in conjunction with the attached drawing FIGS. and with the appended claims.

BRIEF DESCRIPTION OF A PRESENTLY PREFERRED EMBODIMENT

Figure 1:
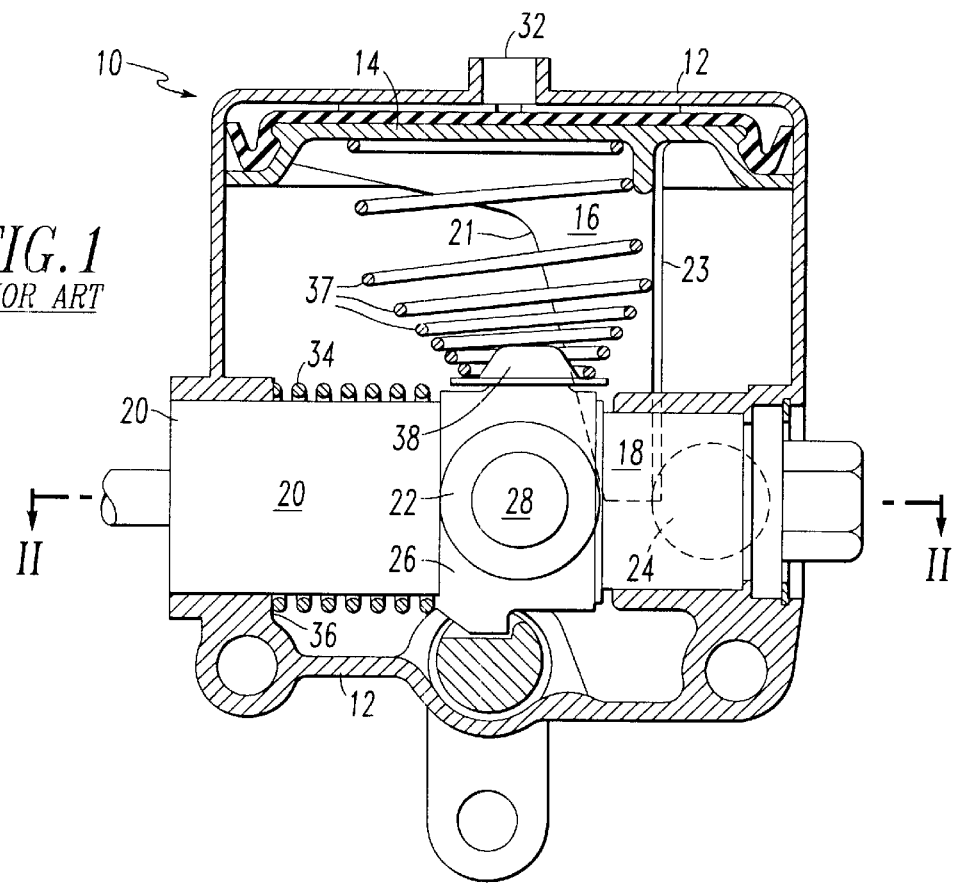
FIG. 1 is a view partially in cross section of a prior art type tread brake unit.

Prior to proceeding to the more detailed description of the present invention, it should be noted that identical components which have identical functions have been identified with identical reference numerals throughout the different views illustrated in the drawing Figures or the sake of clarity and understanding of the invention.

Figure 2:
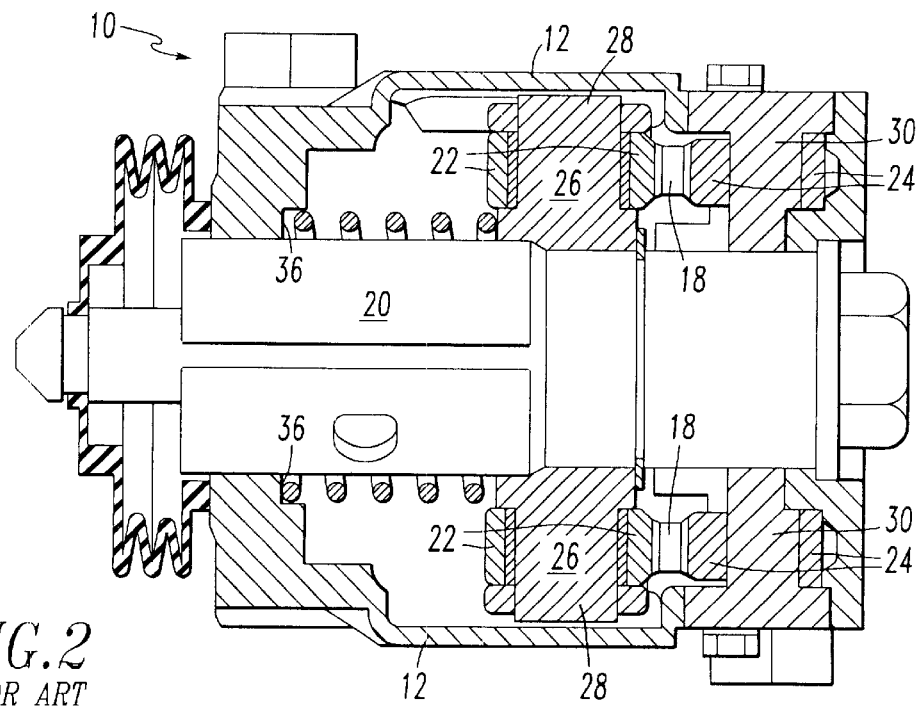
FIG. 2 is a view partially in cross section taken along the lines II—II of the prior art type tread brake unit illustrated in FIG. 1.

Refer now to FIGS. 1 and 2 of the drawings. Illustrated therein is a prior art type tread brake cylinder and unit, generally identified by reference numeral 10. Unit 10 includes an exterior housing 12 containing a piston 14 provided with an integral wedge 16 (FIG. 1). Wedge 16 is fork-shaped in that it has two fingers, or legs 18, that straddle a brake applying rod 20, commonly referred to as a push rod. Such legs 18 extend to locations disposed adjacent diametrically opposed roller bearings 22 and 24. The fingers 18 of the wedge 16 have a front edge 21 that is slanted, or angled (as seen on the left in the view of FIG. 1), while the rear of the wedge 16 (as seen on the right in the view of FIG. 1) has an edge 23 that is substantially perpendicular to the axis of the push rod 20.

A drive sleeve 26 is located on and directly engages push rod 20. Disposed on drive sleeve 26 are opposed integral bosses 28 on which roller bearings 22 are rotationally mounted. This is best seen in FIG. 2 of the drawings. Similarly, a set of roller bearings 24 are located one on each opposed side of the push rod 20 and are rotationally mounted on bosses 30, also, located on opposed sides of push rod 20. Again, as best seen in FIG. 2 of the drawings.

Bosses 28 are an integral part of drive sleeve 26 which is mechanically connected to the push rod 20 in such a manner that these bosses 28 and their associated roller bearings 22 are translatable along the axis of the push rod 20. Bosses 30, on the other hand, are fixed relative to bosses 28. Bosses 30 are an integral part of the tread brake cylinder housing 12, again as best seen in FIG. 2.

The tread brake cylinder 10, illustrated in FIGS. 1 and 2, operates in the following manner. When a pressurized fluid is directed to piston 14 through a port 32 provided in housing 12 (FIG. 1), the piston 14 and its wedge 16 are moved toward and into a position between bearings 22 and 24 such that the legs 18 of the wedge 16 engage the bearings 22 and 24 in a manner that translates the bearings 22 and bosses 28 to the left, in FIGS. 1 and 2, as the rear edge 23 of the wedge 16 engages the bearings 24 rotatably mounted on fixed bosses 30. The translation of bearings 22 and bosses 28 translates the drive sleeve 26 and the push rod 20 to the left against a horizontal spring 34 located around the push rod 20 and between the drive sleeve 26 and an end wall 36 of housing 12.

The push rod 20 is mechanically connected to a brake shoe (not shown) that is disposed to engage the rim of a railway vehicle wheel (not shown) when the push rod 20 is moved forwardly against the horizontal spring 34.

When fluid pressure is removed from the port 32 a vertically disposed spring 37 located between the piston 14 and the drive sleeve 26 returns the piston 14 to the upper portion of housing 12 and removes the legs 18 of the wedge 16 from between the roller bearings 22 and 24. A shallow boss 38 is provided on the drive sleeve 26 and extends into one end of such spring 37, as seen in FIG. 1. The lower turns of such vertical spring 37 travel with the drive sleeve 26 and allow horizontal spring 34 to return push rod 20 and drive sleeve 26 to a position where the brake shoe clears the rim of the vehicle wheel.

Figure 3:
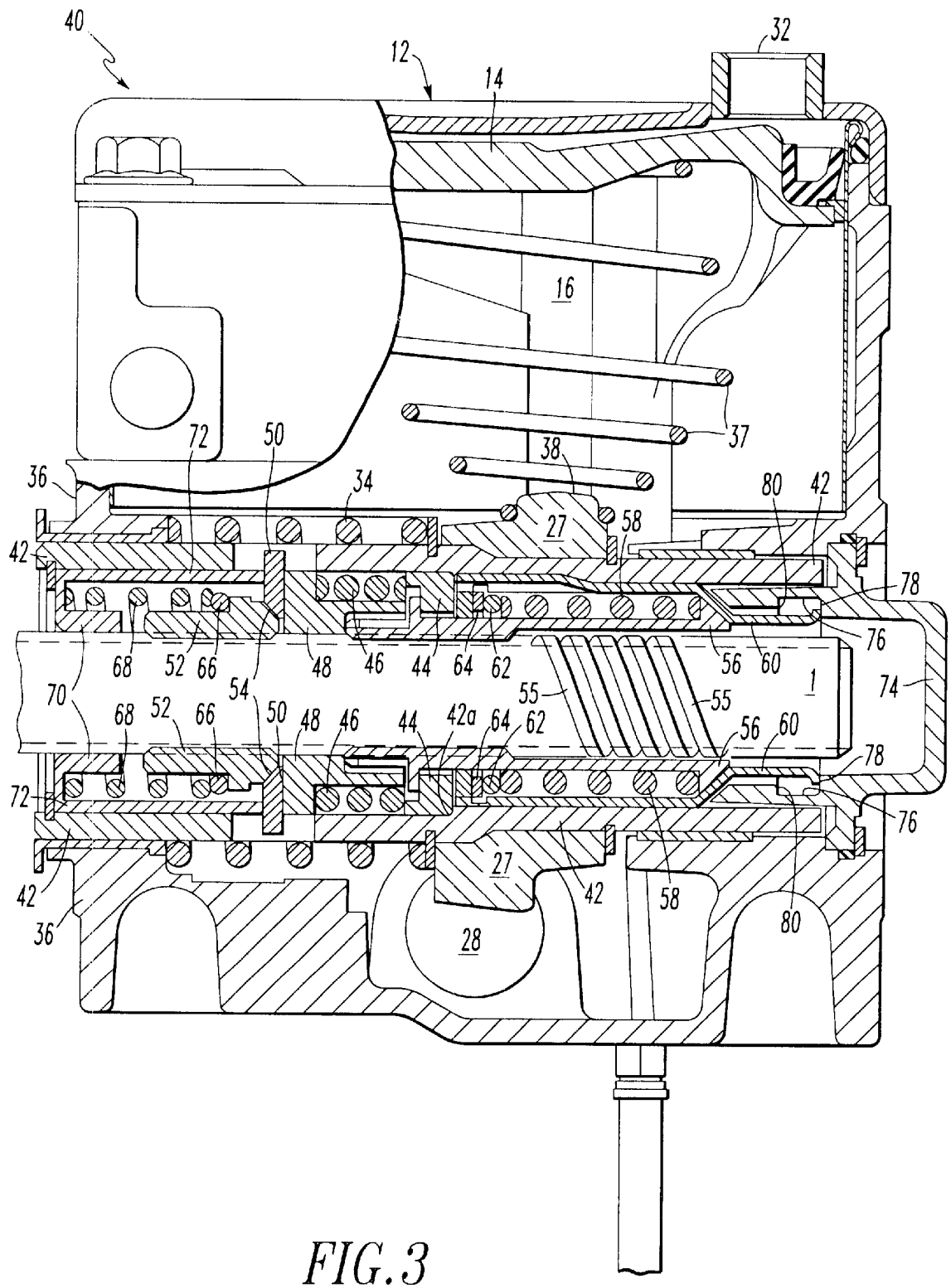
FIG. 3 is a cross sectional view of a currently available tread brake actuator.

FIG. 3 of the drawings illustrates a currently available tread brake unit, generally designated 40, in which an elongated sleeve 42 extends substantially along the length of tread brake unit 40. A pressure ring 44 is located inside of elongated sleeve 42 and abuts against a first, relatively short, horizontal spring 46 located between pressure ring 44 and a rear guide bushing 48. A washer 50 is located between rear guide bushing 48 and a slack adjuster nut 52 that is threaded onto threads 55 of a brake applying spindle 1. Slack adjuster nut 52 engages washer 50 via threads 54 provided on confronting bevelled surfaces of both the washer 50 and slack adjuster nut 52.

A leader nut 56 is also threaded onto spindle 1. A second horizontal spring 58 is engageable at a rear end thereof with leader nut 56. A sleeve 60 is disposed about the second spring 58 and at least a portion of leader nut 56.

A rear bearing 62 is disposed between a forward end of second spring 58, and a retention ring 64 disposed on leader nut 56. Both the spring 58 and the retention ring 64 are located in sleeve 60.

A second bearing 66 is located between adjuster nut 52 and a third horizontal spring 68 captured by a reentrant portion 70 of a sleeve 72. Bearings 62 and 66 are essentially a ball/thrust type bearing that can be fully contained assemblies.

A control socket 74 provides an enclosure for the rear of such spindle 1 and further provides a certain predetermined travel distance for the spindle 1. Such travel distance is defined by a recess 76 provided in control socket 74 and a rear edge 78 of the sleeve 60 located in the recess 76. There is also a fourth spring 34 located between a yoke 27 and a reentrant end wall 36 of the housing 12.

The operation of such unit 40 is as follows: air acting on a piston 14 moves yoke 27 mounted on elongated sleeve 42 to the left, in FIG. 3, and against the fourth spring 34. Such yoke 27 and sleeve 42 are translated to the left by the legs (not shown in FIG. 3) of the wedge 16. The sleeve 42 includes a ledge 42a engaging ring 44 in order to move the ring 44 to the left which, in turn, moves first spring 46 against bushing 48. Bushing 48, in turn, urges washer 50 and nut 52 to the left. Nut 52 moves spindle 1 to the left which, in turn, translates leader nut 56 against second spring 58 and bearing 62 and, in turn, bearing 62 moves retention ring 64 to the left.

Spring sleeve 60 is translated leftwardly with the above components by elongated sleeve 42 until rear edge 78 of sleeve 60 travels the distance provided by socket recess 76 and engages a forward socket surface 80. Leftward travel of spring sleeve 60 stops and the brake of the vehicle is now applied. This allows the beveled teeth on the leader nut 56 to temporarily separate from the beveled teeth of spring sleeve 60 these teeth being visible in FIG. 3 as complementary beveled surfaces. With nut 56 free of sleeve 60, spring 58 causes the nut 56 to rotate on threads 55 of spindle 1 with the aid of bearing 62 towards spring sleeve 60 until the respective beveled teeth of nut 56 and sleeve 60 are re-engaged.

When brake air pressure is removed from piston 14, such fourth spring 34 translates the yoke 27 and sleeve 42 to the right. Such translation returns the other components to the right until rear edge 78 contacts the rear of recess 76 of control socket 74. This stops the retraction of spindle 1 as the sleeve 60 is re-engaged by nut 56 (which is threaded on the spindle 1). Elongated sleeve 42 continues rightward movement until it too reaches the socket 74. This causes the beveled teeth of adjustor nut 52 to separate from the beveled teeth of the washer 50 such that nut 52 rotates along the threaded spindle 1 under the force of spring 68 facilitated by the bearing 66 until such sleeve 42 is fully returned and nut 52 re-engages with the washer 50.

As can be appreciated by the drawing of FIG. 3, the brake unit 40 depicted therein is rather complicated and employs a substantial number of components to effect application and release of railway car brakes. The nuts 52 and 56 are rotatable on the threaded spindle 1 with the aid of bearings 62 and 66, respectively, in cooperation with rings 44 and 64. The sleeves 42 and 60 and such springs 46, 58 and 68 function as ratchets and clutches that make assembly and maintenance of the brake unit 40 costly, heavy and complicated.

The above described operations are those of a typical tread type brake unit having components that the present invention eliminates. The present invention accomplishes this by replacing such components with a collet style slack adjuster, generally of the type shown and described in the above shown and incorporated U.S. Pat. No. 5,423,401 to Noah et al., with the power collet also being shown in Noah et al. These types of collets are generally shown in FIG. 4 of the present drawings.

Figure 4:
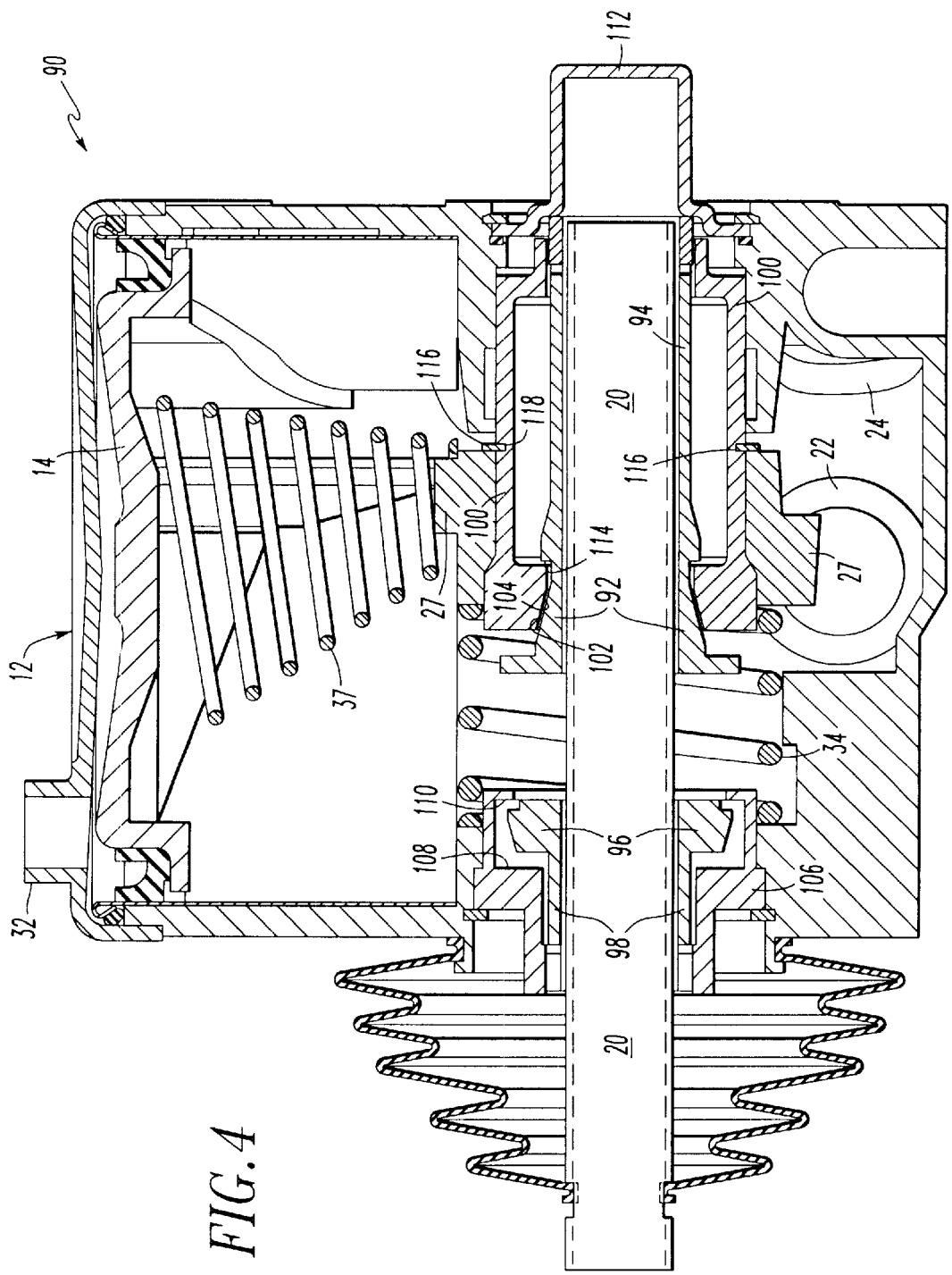
FIG. 4 is a cross sectional view of a presently preferred embodiment of the tread brake unit of the invention employing power and automatic slack adjusting collets.

More particularly, FIG. 4 illustrates a tread brake unit or actuator 90 having a power collet 92 located on a push rod 20. (In FIG. 4, components that are substantially common with those that are depicted in FIGS. 1, 2 and 3 have the same reference numerals). Further, the push rod 20 is preferably provided with external threads or serrations and the main body portion of the power collet 92 is similarly provided with internal threads or serrations. Such threads or serrations enhance friction between the push rod 20 and the power collet 92 when needed.

Power collet 92 has integral, elongated fingers 94 extending rearwardly of the main body thereof. These fingers 94, preferably, have internally smooth surfaces. and are thus not provided with threads or serrations.

A slack adjusting collet 96 is disposed on push rod 20 at a location in front of the power collet 92. Slack adjusting collet 96 also has an integral, internally smooth, unthreaded fingers 98 (facing forwardly) and an internally threaded or serrated surface in the area of the main body thereof.

Power collet 92 is substantially contained in an elongated housing 100 disposed about the power collet 92 and push rod 20. The housing 100 engages the power collet 92 adjacent one end thereof and supports the fingers 94 adjacent the second end thereof. The forwardmost ends of the power collet 92 and the housing 100 have, respectively, corresponding tapered bearing surfaces 102 and 104 for purposes explained hereinafter.

The slack adjusting collet 96 is contained within a fixed housing 106 which is also disposed about the push rod 20. This housing 106 has forward and rear surfaces 108 and 110, respectively, which the slack adjusting collet 96 abuts in manners described hereinafter.

A rear cover 112 is located and suitably secured to the housing 12 of such brake unit 90. Cover 112 protects the rear of such push rod 20 and is sized to provide a positive stop for rearward travel of the power collet 92 for reasons explained below.

Brake unit 90 further includes a yoke 27 supporting axially translatable roller bearings 22 located on opposed sides of the yoke 27, while roller bearings 24 are similarly located on opposite sides of the housing 12. The yoke 27 is mounted on and engages the housing 100 of such power collet 92.

Like the units of FIGS. 1 to 3, brake unit 90 includes a piston 14 and wedge 16 that are moved downwardly (in FIG. 4) when a pressurized fluid is supplied to a housing port 32 above the piston 14. When the wedge fingers (not visible in FIG. 4) enter between the bearings 22 and 24, such yoke 27 is translated to the left in FIG. 4 and, in turn, forwardly translates the collet housing 100 to the left in FIG. 4. When housing 100 moves forwardly, its tapered bearing surface 104 engages the bearing surface 102 of the power collet 92 to force the collet 92 into clamping engagement with the push rod 20. Forward movement of the yoke 27 and collet housing 100 now translates the push rod 20 to move a brake shoe (not shown) to engage an associated wheel of the vehicle (not shown).

Movement of the push rod 20 also translates slack adjusting collet 96 forwardly until the brake shoe engages the vehicle wheel or until the forward face of the collet 96 abuts surface 108 of housing 106. This occurs if the brake shoe and/or wheel is worn to the extent that the collet 96 travels to housing surface 108, i.e., when brake unit 90 is deenergized, a clearance or space "A" (see FIG. 4) exists between the collet 96 and the housing surface 108 that corresponds to a typical clearance (not shown) between the brake shoe and the wheel. This clearance allows the wheel to rotate free of the brake shoe when the brakes of a train vehicle are not applied.

When collet 96 abuts housing surface 108, its fingers 98 flex radially outwardly as the teeth of the collet 96 ride over the teeth on push rod 20. This overcomes the friction between the push rod 20 and collet 96 provided by the force of wedge 16 acting on and between roller bearings 22 and 24. The push rod 20 now travels through the collet 96 until the brake shoe engages and applies a braking force to the vehicle wheel.

The braking force remains until the pressure is removed from the port 32 and piston 14 in housing 12. When pressure is removed, the piston 14 returns to a non-braking position in housing 12 under urging of vertical spring 37 and the integral wedge fingers 18 (FIG. 2) are withdrawn from between bearings 22 and 24.

With the withdrawal of the wedge fingers 18 the horizontal spring 34, acting upon yoke 27, returns the push rod 20 and slack adjusting and power collets 96 and 92, respectively, toward the rear of housing 12 (and to the right in FIG. 4). The slack adjusting collet 96 travels rearwardly until it abuts surface 110 of its fixed housing 106 and its fingers 98 move inwardly to fully engage the push rod 20. This stops movement of the push rod 20 and the actuator 90 of the present invention is now adjusted to any new clearance "A" caused by wear of the wheel tread and brake shoe material, i.e., when the brake shoe is again applied to the wheel the push rod 20 and slack adjusting collet 96 will travel distance "A" to fully apply the brake shoe to the wheel without push rod 20 moving through collet 96.

Yoke 27, in translating power collet 92 to the rear in actuator housing 12, also translates housing 100 of the power collet to the rear. This is effected by housing 100 engaging a ledge 114 of the power collet to move the power collet to the rear. As seen in FIG. 4, yoke 27 is held in place on housing 100 by a retention ring 116 seated in an appropriate slot 118 provided in the outside surface of power collet housing 100.

With rearward movement of housing 100, bearing. surface 104 thereof moves away from the bearing surface 102 of the collet 92, which allows its fingers 94 to flex outwardly from push rod 20 (by virtue of the threads of the collet riding over the threads of the push rod) to release the power collet from the push rod. The power collet 92 is now free to slide over the push rod 20 if the yoke 27 and power collet housing 100 are not in a fully retracted position.

When changing brake shoes, actuator 90 is reset manually by pushing rod 20 into housing 12 until power collet fingers 94 contact rear cover 112 of the actuator 90. When this happens, the power collet 92 is no longer able to move its bearing surface 102 into engagement with the bearing surface 104 of housing 100. This prevents the power collet from clamping on the push rod.

The tread brake actuator 90 of the present invention is substantially simple in construction as it involves only five basic components in the form of two threaded collets 92 and 96, two housings 100 and 106 and a push rod 20. Such components, in addition, are relatively easy to make, generally maintenance free and require an assembly time involving only the placing of the collets and housings on a push rod. Hence, no special equipment is needed to install the housings and collets of the invention. The mechanisms of the invention are also light in weight, as the collets and housings are low mass items. They can also be used to convert most tread brake actuators, as the collets and housings are simply disposed on a push rod in a manner providing an appropriate brake shoe clearance "A".

While a presently preferred embodiment for carrying out the instant invention has been set forth in detail above, those persons skilled in the tread brake art to which this invention pertains will recognize various alternative ways of practicing the invention without departing from the spirit and scope of the claims appended hereto.

I claim:

1. A brake actuator for use in railway transit and similar vehicles to adjust for wear of braking components located on such vehicles, said brake actuator comprising:

(a) an exterior housing member;

(b) a power collet housing disposed for axial movement within said exterior housing member;

(c) a slack adjusting collet housing axially aligned with and spaced from said power collet housing disposed in said exterior housing member;

(d) an elongated rod member at least partially disposed within said external housing member and extendable therefrom in a first direction, said elongated rod member having at least one of an externally threaded surface and a serrated surface extending along a length thereof;

(e) a power collet disposed on said elongated rod member for non rotational movement therealong and within said power collet housing, said power collet having integral fingers for each of gripping and sliding on a surface of said elongated rod member;

(f) a slack adjusting collet disposed on said elongated rod member for non rotational movement therealong and within said slack adjusting collet housing, said slack adjusting collet having integral fingers for each of gripping and sliding on a surface of said elongated rod member;

(g) a yoke member disposed about and in engagement with said power collet housing at an end thereof disposed closely adjacent an end of said integral fingers of said power collet;

(h) an axially translatable bearing disposed on said yoke member;

(i) a fixed bearing secured within said external housing member and spaced from said axially translatable bearing;

(j) a piston member disposed in said external housing member for longitudinal movement in a second direction which is generally perpendicular to said first direction; and (k) a fork-shaped wedge member secured to said piston member disposed astraddle said elongated rod member and in engagement between and with each of said axially translatable bearing and said fixed bearing, said fork-shaped wedge being effective to axially translate said axially translatable bearing and said yoke member and said power collet and said elongated rod member in said first direction.

2. The brake actuator according to claim 1, wherein said power collet has a tapered bearing surface and said housing containing said power collet has a corresponding tapered bearing surface for engaging said bearing surface of said power collet and for forcing the integral fingers of said power collet into clamping engagement with said rod when said yoke member is axially moved by said fork-shaped wedge of said piston.

3. The brake actuator according to claim 1, wherein a forward end of said slack adjusting collet and said housing containing said slack adjusting collet is separated by a clearance corresponding to a clearance provided between a brake shoe and a wheel of such railway transit vehicle.

4. The brake actuator according to claim 1, wherein said brake actuator further includes a spring located between said yoke member and an end wall of a housing of said brake actuator.

5. The brake actuator according to claim 1, wherein said brake actuator further includes a spring located between said piston and said yoke member.

* * * * *